Dec. 6, 1949     A. G. GABLE     2,490,262
ENGINE ROCKER ARM
Filed Sept. 3, 1948

INVENTOR.
Arthur G. Gable

Patented Dec. 6, 1949

2,490,262

UNITED STATES PATENT OFFICE 2,490,262

ENGINE ROCKER ARM

Arthur G. Gable, Toledo, Ohio, assignor to Toledo Stamping & Manufacturing Company, Toledo, Ohio, a corporation of Ohio Application September 3, 1948, Serial No. 47,681

6 Claims. (Cl. 74—519)

My invention relates to engine rocker arms and more particularly to the rocker arms employed in the overhead valve type of internal combustion engines and in which the arm member comprises superimposed layers of metal. Similar types of rocker arms are disclosed in Patents No. 1,449,611 and No. 2,176,083.

In the modern high speed engine, proper oil control for the lubrication of the engine rocker is very essential. Too much lubrication results in excessive oil consumption while too little lubrication results in excessive wear. The importance of the proper amount of lubrication and a means for assuring proper distribution of oil over the top surface of a rocker arm is disclosed in Patent No. 2,288,831.

Originally the superimposed layers of the arm member disclosed in the above-mentioned patents were secured together by spot welding. This construction was not satisfactory because the superimposed layers were not perfectly flat. Oil under pressure from the engine lubricating system would leak out between the two layers which resulted in improper lubrication. In order to overcome this difficulty the superimposed layers were secured together by a brazing process in which the two layers were secured together by a film of copper. This film of copper filled the space between the layers unless the layers were over 0.005 of an inch apart. This process eliminated the leakage of oil between the layers but the heating of the arm member during the brazing process annealed or softened the metal so that it became necessary to heat treat the arm in order to obtain the proper strength qualities. Hence, the brazing process was expensive. My novel engine rocker arm does not require a brazing process in order to provide an oil seal between the layers.

In the present engine rocker arms, long hub flanges are drawn from the layers of the arm member to properly secure a bushing therein. Considerable difficulty is encountered in drawing these hubs, and it is necessary to anneal the metal between draws to prevent the metal from breaking or cracking in the drawing process. My novel engine rocker arm provides a means of securing the bushing in comparatively short hubs and the annealing process is eliminated with a consequent saving in labor and time.

The primary object of the invention is the provision of simple and efficient means for sealing the contacting faces of the arm layers around the carrying shaft without the use of brazing, so as to prevent the escape of oil from the shaft between the meeting faces of the layers other than through a passage provided therefor.

Another object of the invention is to provide a rocker arm of the class described with an improved form of broadened hub bearing that does not require annealing in its manufacture.

Other objects and advantages of the invention will be apparent from the following detailed description, and from the accompanying drawings, in which—

Figure 1:
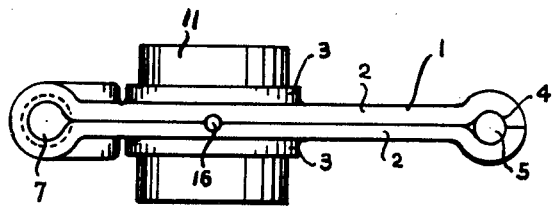
Figure 1 is a top plan view of an engine rocker arm embodying my invention.

Referring to the drawings, I designates a rocker arm embodying the invention and which comprises two duplicate layers 2, 2, secured together in side abutting superimposed relation, preferably by spot welding. These layers may be formed from a single stamping folded upon itself, as shown in Figure 1, or by two separate symmetrical stampings superimposed one on the other. A socket 4 is provided between the layers of the arm member I. The stem 5 of the fixed contacting bearing 6 is secured in the socket 4. The other end of the rocker arm member I is provided with a threaded socket 7. An adjustable contacting bearing 8 is secured in the threaded socket 7 and is locked in a predetermined position by the lock nut 9.

Figure 4:
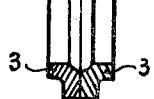
Figure 4 is a sectional view taken along the same line as Figure 3 before the bushing and bearing have been inserted in the rocker arm.

The arm I intermediate its end is vertically broadened and provided therethrough with a hub opening 19 the annular wall of which is broadened axially of the opening by outturning the edge wall of the opening of each arm layer 2 to form an annular axially projecting flange 3. These flanges are comparatively short to permit them to be drawn by a simple stamping operation without the necessity of annealing to facilitate working. The wall of the hub opening is provided between the two arm layers 2 at the inner ends of the flanges 8 with an annular groove 10, as best shown in Figure 4.

Figure 5:
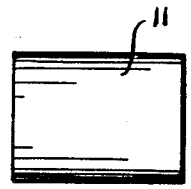
Figure 5 is a front elevation of the hub before it is inserted in the arm member.

A tubular bushing 11 shown in Figure 5, and of a diameter to fit the opening 19, is inserted therein and securely anchored in position by applying pressure to both ends thereof while the inner surface of the bushing 11 is confined, so that an angular portion 12 of the bushing in register with the groove 10 is expanded therein and forms a close sealing contact with the wall of the groove. The annular expanded portion 12 permanently secures the tubular bushing 11 in the hub opening 19. The bushing 11 is longer than the width of the opening wall formed by the flanges 3 and the expanding action forms the interior wall of the bushing with an annular groove 14 in radial register with the groove 10.

Figure 2:
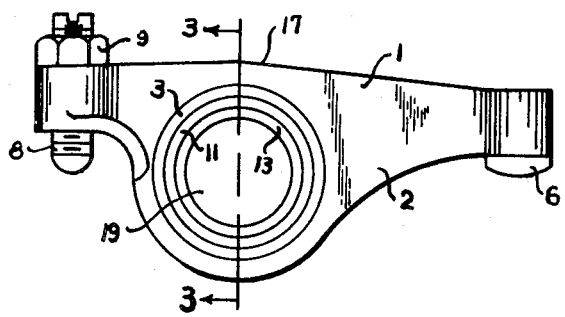
Figure 2 is a front elevation of the engine rocker arm shown in Figure 1 with an adjustable contacting bearing added.
Figure 3:
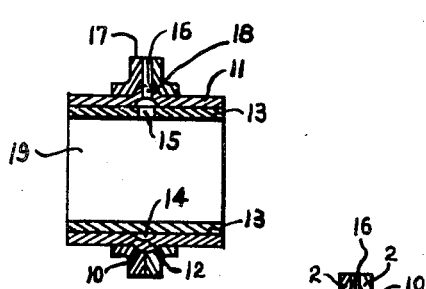
Figure 3 is a sectional view taken along line 3—3 of Figure 2.
Figure 6:
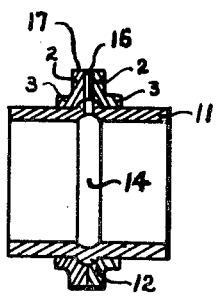
Figure 6 is a sectional view through the hub showing a modification of my novel invention.

While the bushing 11 may itself form the bearing for the rocker arm shaft (not shown), as indicated in Figure 6, it is preferable to firmly fit an inner bearing bushing 13 in the bushing 11, as shown in Figures 2 and 3, for direct contact with the shaft. This inner bushing is pressed into the outer bushing so as to form a close sealing contact therewith. When both bushings are used, the inner one co-operates with the groove 14 to form a passage for the circulation of oil entirely around the shaft at the outer side of the inner bushing. Likewise, if the inner bushing 13 is eliminated and the shaft is mounted directly in the outer bushing 11, the groove forms an annular oil circulating passage directly around the shaft.

The lubricant is fed from the hollow rocker arm shaft either directly to the groove 14, if a single bushing is used, or to such groove through an aperture 15 in the inner bushing, if the two bushings are used. The lubricant is fed to the top edge 17 of the rocker arm from the groove 14 through a passage 18 in the top of the bushing 11 and through a registering passage 16 which is formed between the two layers of the arm and extends to the top surface thereof. The lubricant then flows along the top surface to each end of the rocker arm and to the contact bearings, as well understood in the art.

It will be noted that the annular expanded portion of the bushing 11 and the inner bushing member 13 provides an oil passage which prevents oil from leaking or flowing through between the layers 2, 2, of the rocker arm. This eliminates the necessity of brazing the arm layers together to prevent the leakage of oil therebetween, and thus enables the layers to be secured together by spot welding. Since the brazing process requires high temperatures, the contacting bearing is thereby annealed or softened so that it is necessary to again reharden it after the brazing process.

My improved rocker arm construction is also important as providing a bushing 11 to back or strengthen the bearing member 13 so that the opening flanges 8 do not need to be very long. The provision of short flanges 8 eliminates cracking or breaking when being drawn from the arm members 2. In the present type of rocker arm, similar to the construction shown in Patent 2,425,394, the hub flanges must be drawn of sufficient lengths to cover or back the entire bearing member, and great difficulty has been encountered in accomplishing this.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. An engine rocker-arm comprising: an arm member, said arm member comprising superimposed layers; a contacting bearing at each end of said arm member; annular flanges struck in opposite directions from said superimposed layers intermediate the ends of said arm member; an annular groove between said superimposed layers in axial alignment with said annular flanges and a tubular bushing member secured in said annular flanges by means of an annular portion of said bushing being expanded into said annular groove.

2. An engine rocker arm comprising an arm member, said arm member comprising superimposed stampings; a contacting bearing at each end of said arm member; annular flanges extending in opposite directions from said superimposed stampings intermediate the ends thereof; an annular groove between said superimposed stampings in axial alignment with said annular flanges; a tubular bushing member secured in said annular flanges by means of an annular portion expanded into said annular groove; and an oil passageway extending from the inner surface of said tubular bushing member to the top edge of the arm.

3. An engine rocker arm comprising an arm member composed of superimposed layers having sockets at its ends for contact bearings, said layers having axially registering hub openings intermediate their ends, a tubular bushing mounted in said openings and sealing the line of contact of the arm layers around said bushing and having an annular oil groove in its inner side, said bushing having a radial oil passage from said groove, and said arm having a passage extending upwardly between its layers from said first passage to the top edge of the arm, and a bearing bushing mounted in said first bushing to close the inner side of the groove therein and having a radial passage therethrough opening into said groove.

4. An engine rocker arm comprising an arm member composed of superimposed layers having sockets at its ends for contact bearings, said layers having axially registering openings intermediate their ends and forming an annular inwardly opening recess between the inner marginal edges of the opening walls, a tubular bushing mounted in said openings and having an annular oil groove in the inner side of the bushing, said bushing having a radial oil passage from said groove, and said arm having a passage extending upwardly between its layers from said first passage to the top edge of the arm, and a bearing bushing mounted in said first bushing to close the inner side of the groove therein and having a radial passage therethrough opening into said groove.

5. An engine rocker arm comprising an arm member composed of superimposed layers having sockets at its ends for contact bearings, said layers having axially registering openings intermediate their ends with outwardly flanged walls and co-operating to form an annular inwardly openings recess between said walls, and a tubular bushing mounted in said openings and having an annular portion expanded into said recess and forming an annular oil groove in the inner side of the bushing, said bushing having a radial oil passage from said groove and said arm having a passage extending upwardly between its layers from said first passage to the top edge of the arm.

6. An engine rocker arm comprising an arm member composed of superimposed layers having sockets at its ends for contact bearings, said layers having axially registering openings intermediate their ends with outwardly flanged walls and cooperating to form an annular inwardly opening recess between said walls, a tubular bushing mounted in said openings and having an annular portion expanded into said recess and forming an annular oil groove in the inner side of the bushing, said bushing having a radial oil passage from said groove and said arm having a passage extending upwardly between its layers from said first passage to the top edge of the arm, and a bearing bushing mounted in said first bushing to close the inner side of the groove therein and having a radial passage therethrough opening into said groove.

ARTHUR G. GABLE.

REFERENCES CITED

The following references are of record in the file of this patent:

UNITED STATES PATENTS

| Number | Name | Date |
| --- | --- | --- |
| 136,198 | Aland | Feb. 25, 1873 |
| 1,350,178 | Pribil | Aug. 17, 1920 |
| 2,176,083 | Leake | May 22, 1937 |
| 2,217,742 | Gillette | Oct. 15, 1940 |
| 2,345,822 | Leake | Apr. 4, 1944 |